(12) United States Patent
Erickson

(10) Patent No.: US 6,368,702 B1
(45) Date of Patent: Apr. 9, 2002

(54) RIGID THERMOFORMABLE FOAM FOR HEADLINER APPLICATION

(75) Inventor: Brian L. Erickson, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 09/240,222

(22) Filed: Jan. 29, 1999

(51) Int. Cl.⁷ .................................. B32B 27/04
(52) U.S. Cl. .................. 428/292.1; 428/287.7; 428/300.7
(58) Field of Search ................. 428/297.7, 300.7, 428/292.1

(56) References Cited

U.S. PATENT DOCUMENTS

| | | |
|---|---|---|
| 3,867,240 A | 2/1975 | Doerfling |
| 4,020,207 A | 4/1977 | Alfter et al. |
| 4,043,589 A | 8/1977 | Alfter et al. |
| 4,052,241 A | 10/1977 | Walter |
| 4,131,702 A | 12/1978 | Alfter et al. |
| 4,150,850 A | 4/1979 | Doerfling |
| 4,172,918 A | 10/1979 | Doerer |
| 4,214,788 A | 7/1980 | Srock |
| 4,352,522 A | 10/1982 | Miller |
| 4,363,848 A | 12/1982 | Le Duc et al. |
| 4,432,580 A | 2/1984 | Lohmar et al. |
| 4,741,945 A | 5/1988 | Brant et al. |
| 4,840,832 A | 6/1989 | Weinle et al. |
| 5,007,976 A | 4/1991 | Satterfield et al. |
| 5,049,439 A | 9/1991 | Robinson |
| 5,082,716 A | 1/1992 | Satterfield et al. |
| 5,089,328 A | 2/1992 | Doerer et al. |
| 5,164,254 A | 11/1992 | Todd et al. |
| 5,494,737 A | 2/1996 | Sakai et al. |
| 5,503,903 A | 4/1996 | Bainbridge et al. |
| 5,549,776 A | 8/1996 | Juriga |
| 5,565,259 A | 10/1996 | Juriga |
| 5,660,908 A | 8/1997 | Kelman et al. |
| 5,700,050 A | 12/1997 | Gonas |
| 5,709,925 A | 1/1998 | Spengler et al. |
| 5,721,038 A | 2/1998 | Kornylo et al. |

FOREIGN PATENT DOCUMENTS

| | | |
|---|---|---|
| EP | 0238472 A2 | 9/1987 |
| EP | 0473372 A2 | 3/1992 |
| EP | 0620109 A1 | 10/1994 |
| GB | 1223598 | 2/1971 |
| JP | 6-24278 | 2/1994 |

Primary Examiner—Edward J. Cain
(74) Attorney, Agent, or Firm—Price, Heneveld, Cooper, DeWitt & Litton

(57) ABSTRACT

A thermoformable laminate including a rigid thermoplastic foam sheet and a fiber reinforcing layer adhered to each of two opposite faces of the rigid thermoplastic foam sheet is heated to the thermoforming softening temperature of the rigid thermoplastic foam sheet, and shaped and compressed to form a headliner having varying thicknesses, including a major portion of the headliner which is relatively thin and highly compressed, and at least one relatively thick, lightly compressed or non-compressed impact absorption area. The thermoformable laminate and method make it possible to form a headliner with integral impact absorption areas from a laminate of uniform thickness and density, using a single thermoforming operation.

21 Claims, 1 Drawing Sheet

RIGID THERMOFORMABLE FOAM FOR HEADLINER APPLICATION

FIELD OF THE INVENTION

This invention relates to vehicle headliners, a method for forming a vehicle headliner from a thermoformable laminate, and a thermoformable laminate which is useful for making vehicle headliners.

BACKGROUND OF THE INVENTION

In recent years, automobile manufacturers have been motivated to design vehicle passenger compartments with improved impact absorption panels located at selected areas of the vehicle interior to reduce head injuries to vehicle occupants on account of secondary collisions during an accident. In order to meet or exceed current safety standards (e.g., Federal Motor Vehicle Safety Standard-201), vehicle manufacturers have generally used impact absorbing panels which are formed separately from the vehicle headliner, and which are attached to the vehicle roof and/or the headliner at locations where impact absorption is most needed, such as at the portion of the roof which is adjacent to the upper edge of the windshield, and at areas of the roof near pillars. The production of separate impact absorption units, however, significantly increases manufacturing and assembly costs.

To achieve some savings during the final assembly stages, manufacturers have integrated impact absorption panels into the headliner such as by forming the headliner and impact absorption panels separately, piecing the headliner and impact absorption panels together in a mold with the aid of adhesives, and fusing the pieces together to form a headliner with integrally attached impact absorption panels. The finished headliner with integrally attached impact absorption panels can be installed in a vehicle as a single unit, thereby simplifying vehicle assembly. However, the steps of forming separate impact absorbing panels and integrally attaching the impact absorbing panels to the headliner adds significantly to the cost of the headliner.

Efforts have also been made to form headliners having varying thicknesses and densities depending on the area of the headliner, with relatively thick areas being formed where impact absorption may be important. With such increased thickness, however, the manufacture of the headliner, through a molding process, becomes increasingly complex and expensive.

U.S. Pat. No. 5,823,611 discloses an improved headliner having one or more integrally formed flaps extending from an edge of the headliner and integrally hinged to the edge of the headliner. The flaps are folded over the top of the headliner and concealed in the area between the headliner and vehicle roof. In one embodiment, the flaps are formed of a pleated headliner material to provide a crushable impact absorption material. In another embodiment, higher density headliner material is employed, and the flaps are compressed headliner material which provides a relatively thin high density impact absorption padding. Although the headliners with integrally formed flaps disclosed in U.S. Pat. No. 5,823,611 offer a simple and efficient method of economically providing a vehicle headliner with integrally attached impact absorption panels which meets or exceeds current safety standards, it would be desirable to further simplify production by thermoforming a headliner with integral impact absorption panels, without requiring the additional steps of folding a hinged flap over the top of the headliner and securing it, such as with an adhesive, to the top of the headliner.

SUMMARY OF THE INVENTION

The invention provides a thermoformable laminate which can be shaped and compressed in a thermoforming tool to form a vehicle headliner with at least one integral impact absorption area; a method of forming a headliner with at least one integral impact absorption area by heating, shaping and compressing the thermoformable laminate; and the resulting vehicle headliner with at least one integral impact absorption area.

The headliner with integral impact absorption areas meets or exceeds current safety standards for impact absorption (FMVSS-201), while eliminating separate steps associated with preparation of the impact absorption areas, as are required with known methods. In particular, the present invention provides a method of forming a vehicle headliner, having integral impact absorption areas, from a laminate, using a thermoforming technique, thereby eliminating the need for separate impact absorption panels which are subsequently integrated into the roof structure of the vehicle or into the vehicle headliner, and eliminating the need for separate folding and attachment operations subsequent to the thermoforming operation. The invention, therefore, provides a simpler, more economical method of meeting or exceeding current safety standards for impact absorption at the roof area of a vehicle.

The thermoformable laminate of the invention includes a rigid thermoplastic form sheet and a fiber reinforcing layer adhered to each of two opposite faces of the rigid thermoplastic sheet.

The method of forming a vehicle headliner with at least one integral impact absorption area involves the steps of providing a thermoformable laminate including a rigid thermoplastic foam sheet having a thermoforming softening temperature range, a substantially uniform thickness, and a substantially uniform density, and a fiber reinforcing layer adhered to each of two opposite faces of the rigid thermoplastic foam sheet; heating the thermoformable laminate to the thermoforming softening temperature; and shaping and compressing the heated thermoformable laminate to form a headliner having varying thicknesses, including a major portion of the headliner which is relatively thin and highly compressed, and at least one relatively thick, lightly compressed or non-compressed impact absorption area.

The resulting vehicle headliner with at least one integral impact absorption area includes a thermoformed laminate having a unitary, rigid thermoplastic foam sheet which has a major portion which is relatively thin and dense, and at least one relatively thick, lower density impact absorbing area.

DESCRIPTION OF THE PREFERRED EMBODIMENTS

Figure 1:
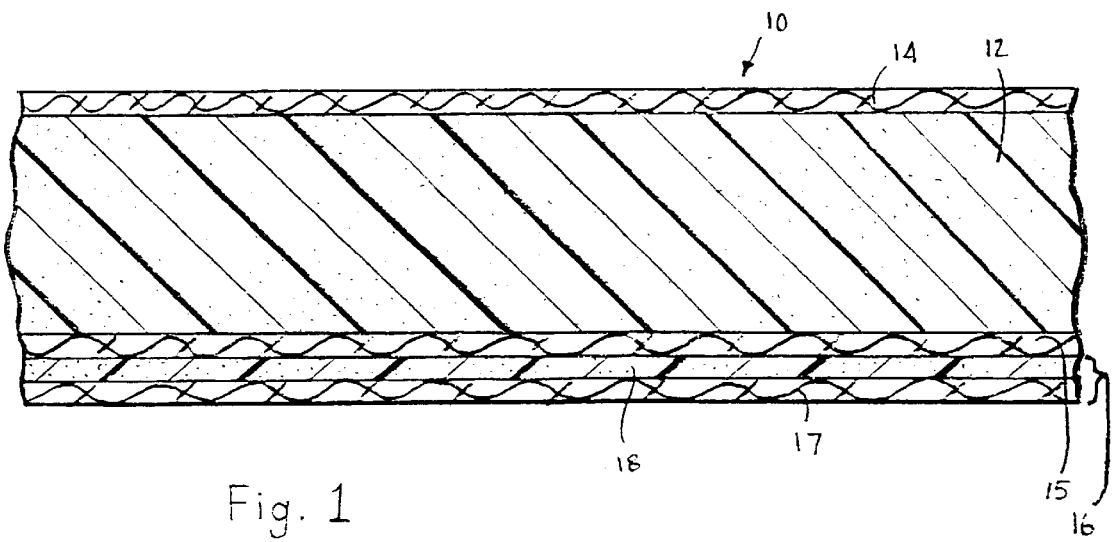
FIG. 1 schematically illustrates a cross-sectional view of a thermoformable laminate in accordance with the invention.
Figure 2:
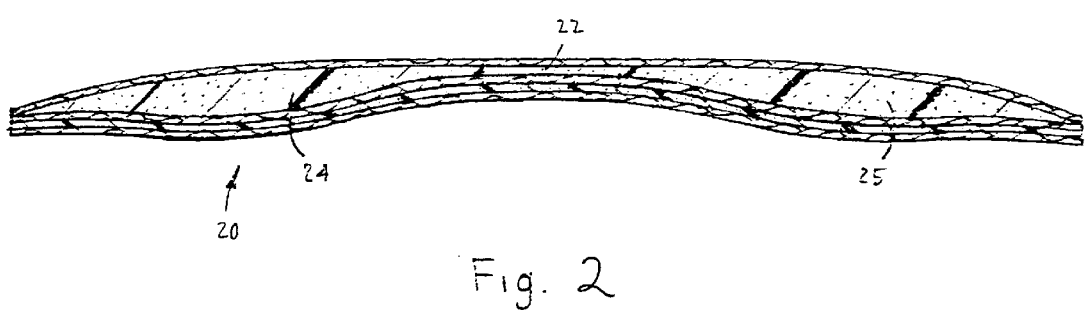
FIG. 2 shows the same structure after being thermoformed into a vehicle headliner.

The laminate 10 (FIG. 1) used to form a vehicle headliner 20 (FIG. 2) with at least one integral impact absorption area includes a rigid thermoplastic foam sheet 12, and fiber reinforcing layers 14, 15, which are adhered to each of two opposite faces of the rigid thermoplastic foam sheet 12. Prior to thermoforming, the thermoformable laminate and the layers thereof have a substantially uniform thickness and density, as shown in FIG. 1. Headliner 20 is prepared by heating the thermoformable laminate 10 to the thermoforming softening temperature range of the rigid thermoplastic foam sheet 12, and shaping and compressing the laminate in a tool having a cavity of varying thickness, to form a vehicle headliner 20 having variable thickness, including a major portion, such as portion 22, which is relatively thin, dense and highly compressed, as compared with the relatively thin, lower density, lightly compressed or non-compressed impact absorption areas 24, 25.

The rigid thermoplastic foam sheet 12 can be made of generally any rigid thermoplastic foam material which is capable of being shaped under the influence of heat and pressure, is capable of retaining a predetermined shape after being thermoformed under the influence of heat and pressure, and is capable of being crushed and absorbing impact at normal use temperatures (which are below the temperatures at which the rigid thermoplastic foam sheet can be shaped). It is desirable that the rigid thermoplastic foam sheet be made of a material which will remain rigid and is incapable of thermoplastic deformation at normal use temperatures, i.e., over the range of temperatures to which an installed vehicle headliner may normally be subjected. Preferably, the lower limit of the thermoforming softening temperature range of the rigid thermoplastic foam sheet 12 should be at least about 120° C., i.e., rigid thermoplastic foam sheet 12 preferably does not exhibit thermoplastic deformation properties below a temperature of about 120° C. However, it is desirable that rigid thermoplastic foam sheet 12 be thermoplastically deformable, i.e., thermoformable, at temperatures which are only slightly in excess of the normal use temperatures. This will minimize the amount of heat required, and the time needed to heat rigid thermoplastic foam sheet 12 to a temperature at which it can be thermoformed. Headliners can be more economically produced by minimizing the time and energy required for the thermoforming operation. Thus, it is desirable that rigid thermoplastic foam sheet 12 be thermoformable at a temperature below about 190° C., more preferably below about 160° C.

Suitable foam materials which exhibit the desired rigidity at normal use temperatures, and the desired thermoplasticity at elevated, thermoforming temperatures, include a variety of thermoplastic polyurethanes. A suitable commercially available rigid thermoplastic polyurethane foam which can be used for sheet 12 is manufactured by Woodbridge Foam Corporation and is identified as RT 2525. Rigid thermoplastic foam sheet 12 preferably has a density of from about 1.5 to 2.5 pounds per cubic foot, and more preferably about 2 pounds per cubic foot before being subjected to thermoforming. The rigid thermoplastic foam should be selected so that sheet 12 can be compressed, during thermoforming, by at least 50% (i.e., to 50% of its original thickness and twice its original density), more preferably at least 60% (i.e., to 40% of its original thickness and about 2.5 times its original density), and most preferably at least 70% (i.e., 30% of its original thickness and about 3.3 times its original density), without exhibiting any substantial expansion after the thermoforming operation is completed and the headliner is removed from the thermoforming tool. Rigid thermoplastic foam sheet 12 preferably has a thickness of from about 18 millimeters to about 25 millimeters. Below 18 millimeters of thickness, the impact absorbing properties of the impact absorption areas 24, 25 of vehicle headliner 20 become unacceptable or only marginally acceptable. Although a thickness greater than 25 millimeters may be used, high quality vehicle headliners with integral impact absorbing areas which exhibit excellent impact absorbing properties, can be prepared from laminates 10 in which the rigid thermoplastic foam sheet 12 is less than or equal to about 25 millimeters. Further, when the initial thickness of rigid thermoplastic foam sheet 12 exceeds about 25 millimeters, the resulting headliner formed from the laminate tends to occupy an excessive amount of space below the roof of a vehicle.

In order to provide an economical and highly efficient thermoformable foam sheet 12 which can be heated to its thermoforming softening temperature in a reduced amount of time, while at the same time providing uniform temperature distribution and slow cooling, it is desirable that rigid thermoplastic foam sheet 12 be doped with carbon black having a concentration within the range of 0.0000081 to 0.0081% by weight. The preferred carbon black utilized is a furnace black, although other types of carbon black can be used, such as lamp black, channel black, oil furnace black, and the like. The carbon black utilized has a fineness or surface area of about 25 square meters per gram. The carbon black can be incorporated into a polyurethane foam such as by adding a premixed concentrate, comprising the carbon black and a dispersing agent to the polyol used to form the polyurethane. One suitable commercially available dispersing agent is generally known as Rebus 2104. Other methods of uniformly dispersing particulate matter in a foamed plastic are well known and will not be further described herein. The carbon black particles dispersed in the foam act as infrared receptors which allow the rigid thermoplastic foam sheet to be heated more quickly and uniformly using infrared heating, such as with quartz lamp electric heaters.

Fiber reinforcing layers 14, 15 may be comprised of reinforcing glass fibers or reinforcing thermoplastic fibers which are adhesively bonded to each of two opposite faces of rigid thermoplastic foam sheet 12. Examples of suitable thermoplastic fibers include polypropylene fibers, nylon fibers, and polyethylene terephthalate (PET) fibers, with PET fibers being preferred. The reinforcing fibers may be adhered to rigid thermoplastic foam sheet 12 in the form of random chopped fibers, or in the form of a lightweight woven or non-woven fabric or scrim. The amount of reinforcing fiber used in each of the fiber reinforcing layers 14, 15 is typically from about 0.1 to about 2.5 ounces per square yard, and more preferably from about 0.2 to about 1.0 ounces per square yard. A suitable scrim which may be employed is a spun-bonded, non-woven PET material having a weight of about 0.6 ounces per square yard. The reinforcing fibers are adhered to rigid thermoplastic foam sheet 12 by a thermoplastic hot-melt adhesive. The thermoplastic adhesive can be applied to opposite sides of rigid thermoplastic foam sheet 12 in the form of a film, or by spray-applying the adhesive in liquid form to opposite sides of foam sheet 12. Therefore, reinforcing fibers, in the form of random chopped fibers, or in the form of a woven or non-woven fabric or scrim, can be applied to the adhesive, which can be melted before or after application of the reinforcing fibers. Preferably, the reinforcing fibers are embedded within the thermoplastic hot-melt adhesive. This can be achieved by applying an adhesive layer to each of the opposite faces of rigid thermoplastic foam sheet 12, applying the reinforcing fibers to each of the adhesive layers, and then applying additional thermoplastic adhesive over the reinforcing fibers on each of the opposite faces of rigid thermoplastic foam sheet 12. Alternatively, the reinforcing fibers may be pre-embedded within a thermoplastic adhesive, such as between two thermoplastic adhesive films, which may be adhered as a unit to each of the opposite faces of rigid thermoplastic foam sheet 12.

An upholstery fabric 16 is adhesively bonded to fiber reinforcing layer 15. This can be achieved by pressing fabric 16 against layer 15 while the thermoplastic adhesive in reinforcing layer 15 is in a liquid state. Upholstery layer 16 is preferably a pliable composite comprising an outer, exposed fabric 17, which is adhered to a flexible foam backing layer 18.

Vehicle headliner 20 is formed from thermoformable laminate 10 by heating laminate 10 to the thermoforming softening temperature range of rigid thermoplastic foam sheet 12, and shaping and compressing the heated thermoformable laminate in a tool defining a mold cavity, to form a headliner having varying thicknesses. Headliner 20 includes a major portion 22 which is relatively thin and highly compressed; and relatively thick, lightly compressed or non-compressed impact absorption areas 24, 25. The location of the impact absorption areas will depend on the roof configuration of the particular vehicle into which the headliner is to be installed. However, the relatively thick, lower density energy absorbing areas are typically located adjacent the rails around the perimeter of the roof, typically about 15 millimeters from the edge of the headliner. As stated above, prior to shaping and compressing the thermoformable laminate 10, rigid thermoplastic foam sheet 12 preferably has a uniform thickness of from about 18 to 25 millimeters, and a uniform density of about 2 pounds per cubic foot. After shaping and compressing of the thermoformable laminate, the rigid thermoplastic foam layer of the resulting vehicle headliner 20 has varying density and thickness. Typically, the major portion of the headliner will be relatively thin and dense, generally having a thickness of from about 5.4 millimeters to about 12 millimeters, and a density of from about 3 to about 4.5 pounds per cubic foot. The relatively thick, lower density impact absorbing areas will typically have a thickness of from about 18 to about 25 millimeters, and a density of from about 2 to about 2.5 pounds per cubic foot. Transitional areas between the relatively thin and dense major portion of the thermoplastic foam sheet of headliner 20 and the relatively thick, lower density impact absorbing areas of the thermoplastic foam sheet of headliner 20 will typically have intermediate densities of from about 2.5 to about 3 pounds per cubic foot and intermediate thicknesses of from about 12 millimeters to about 18 millimeters.

In addition to more economically providing a high quality vehicle headliner with integral impact absorption areas, the resulting vehicle headliner also exhibits excellent acoustic properties when the fiber reinforcing layer 15 and upholstery layer 16 are sufficiently porous to allow air to be blown through these layers. The integral energy absorption areas 24, 25 exhibit energy absorption properties that are comparable to known energy absorption panels which are separately molded. Another advantage with the laminates of this invention is that they allow different headliners having different shapes and different thicknesses to be formed from the same thermoformable laminate.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A thermoformable laminate comprising:
   a rigid thermoplastic foam sheet, and a fiber reinforcing layer adhered to each of two opposite faces of the rigid thermoplastic foam sheet, wherein the rigid thermoplastic foam sheet is doped with carbon black at a concentration of from about 0.0000081 to about 0.0081% by weight.

2. A method of forming a headliner with at least one integral impact absorption area, comprising:
   providing a thermoformable laminate including a rigid thermoplastic foam sheet having a thermoforming softening temperature range, a substantially uniform thickness, and a substantially uniform density, and a fiber reinforcing layer adhered to each of two opposite faces of the rigid thermoplastic foam sheet;
   heating the thermoformable laminate to the thermoforming softening temperature range; and
   shaping and compressing the heated thermoformable laminate to form a headliner having varying thicknesses, including a major portion of the headliner which is relatively thin and highly compressed, and at least one relatively thick, lightly compressed or non-compressed impact absorption area.

3. The method of claim 1, wherein the rigid thermoplastic foam sheet is a rigid thermoplastic polyurethane foam sheet.

4. The method of claim 1, wherein the thermoforming softening temperature range is in the range from about 120° C. to about 190° C.

5. The method of claim 1, wherein the rigid thermoplastic foam sheet has a density of from about 1.5 to about 2.5 pounds per cubic foot before being shaped and compressed.

6. The method of claim 1, wherein the rigid thermoplastic foam sheet has a thickness of from about 18 millimeters to about 25 millimeters before being shaped and compressed.

7. A method of forming a headliner with at least one integral impact absorption area, comprising:
   providing a thermoformable laminate including a rigid thermoplastic foam sheet having a thermoforming softening temperature range, a substantially uniform thickness, and a substantially uniform density, and a fiber reinforcing layer adhered to each of two opposite faces of the rigid thermoplastic foam sheet;
   heating the thermoformable laminate to the thermoforming softening temperature range; and
   shaping and compressing the heated thermoformable laminate to form a headliner having varying thicknesses, including a major portion of the headliner which is relatively thin and highly compresses, and at least one relatively thick, lightly compressed or non-compressed impact absorption area, wherein the rigid thermoplastic foam sheet is doped with carbon black at a concentration of from about 0.0000081 to about 0.0081% by weight.

8. The method of claim 1, wherein the thermoformable laminate further comprises an upholstery layer laminated to a first of the fiber reinforcing layers.

9. The method of claim 1, wherein the upholstery layer comprises an outer exposed fabric layer and a flexible foam layer disposed between the outer exposed fabric layer and the first of the fiber reinforcing layers.

10. A vehicle headliner with at least one integral impact absorption area, comprising:
    a thermoformed laminate including a unitary, rigid thermoplastic foam sheet which has a major portion which is relatively thin and dense, and at least one relatively thick, lower density impact absorption area.

11. The headliner of claim 10, wherein the relatively thin and dense major portion of the thermoplastic foam sheet has a density of from about 3 to about 4.5 pounds per cubic foot, and the relatively thick lower density impact absorption area has a density of from about 2 to about 2.5 pounds per cubic foot.

12. The headliner of claim 11, wherein the relatively thin and dense major portion of the thermoplastic foam sheet has a thickness of from about 5.4 to about 12 millimeters, and the relatively thick, lower density impact absorption area has a thickness of from about 18 to about 25 millimeters.

13. The headliner of claim 10, wherein the rigid thermoplastic foam sheet is a rigid thermoplastic polyurethane foam sheet.

14. The headliner of claim 10 further comprising fiber reinforcing layers adhered to each of two opposite faces of the rigid thermoplastic foam sheet, and an upholstery layer adhered to a first of the fiber reinforcing layers, the upholstery layer comprising an outer exposed fabric layer and a flexible foam layer, the flexible foam layer being disposed between the outer exposed fabric layer and the first of the fiber reinforcing layers.

15. A thermoformable laminate comprising:

a rigid thermoplastic foam sheet, and a fiber reinforcing layer adhered to each of two opposite faces of the rigid thermoplastic foam sheet, wherein the rigid thermoplastic foam sheet has a density of from about 1.5 to about 2.5 pounds per cubic foot and a thickness of from about 18 millimeters to about 25 millimeters.

16. The laminate of claim 15, wherein the rigid thermoplastic foam sheet is a rigid thermoplastic polyurethane foam sheet.

17. The laminate of claim 15, wherein the rigid thermoplastic foam sheet has a thermoforming softening temperature range in the temperature range of from about 120° C. to about 190° C.

18. The laminate of claim 15, further comprising an upholstery layer laminated to a first of the fiber reinforcing layers, the upholstery layer comprising an outer exposed fabric layer and a flexible foam layer disposed between the outer exposed fabric layer and the first of the fiber reinforcing layers.

19. A thermoformable laminate comprising:

a rigid polyurethane foam sheet and a fiber reinforcing layer adhered to each of two opposite faces of the rigid polyurethane foam sheet, wherein the rigid polyurethane foam sheet has a thickness of from about 18 millimeters to about 25 millimeters.

20. The laminate of claim 19, wherein the rigid polyurethane foam sheet has a thermoforming softening temperature range in the temperature range of from about 120° C. to about 190° C.

21. The laminate of claim 19, further comprising an upholstery layer laminated to a first of the fiber reinforcing layers, wherein the upholstery layer comprises an outer exposed fabric layer and a flexible foam layer disposed between the outer exposed fabric layer and the first of the fiber reinforcing layers.

* * * * *

UNITED STATES PATENT AND TRADEMARK OFFICE
CERTIFICATE OF CORRECTION

PATENT NO.    : 6,368,702 B1
DATED         : April 9, 2002
INVENTOR(S)   : Brian L. Erickson It is certified that error appears in the above-identified patent and that said Letters Patent is hereby corrected as shown below:

<u>Column 6,</u>
Lines 21, 23, 26 and 29, "claim 1" should be -- claim 7 --.
Line 46, "compresses" should be -- compressed --.
Lines 52 and 55, "claim 1" should be -- claim 7 --.

Signed and Sealed this

Eighteenth Day of February, 2003

JAMES E. ROGAN
*Director of the United States Patent and Trademark Office*